(12) United States Patent
Rahman et al.

(10) Patent No.: US 8,352,050 B2
(45) Date of Patent: Jan. 8, 2013

(54) SYSTEM AND METHOD FOR DISPLAYING STATUS OF FIELD DEVICES

(75) Inventors: Hafeezur Rahman, Chennai (IN);
Rajesh Kumar Jain, Sagar (IN)

(73) Assignee: Yokogawa Electric Corporation, Tokyo (JP)

( * ) Notice: Subject to any disclaimer, the term of this patent is extended or adjusted under 35 U.S.C. 154(b) by 574 days.

(21) Appl. No.: 12/231,012

(22) Filed: Aug. 28, 2008

(65) Prior Publication Data
US 2009/0118843 A1 May 7, 2009

(30) Foreign Application Priority Data

Nov. 6, 2007 (SG) .............................. 200717537-5

(51) Int. Cl.
*G05B 6/00* (2006.01)
(52) U.S. Cl. ............ 700/79; 700/26; 715/772; 717/178; 717/121

(58) Field of Classification Search .................... 700/26, 700/79; 715/772; 717/178, 121
See application file for complete search history.

(56) References Cited

U.S. PATENT DOCUMENTS

| 7,096,465 B1 * | 8/2006 | Dardinski et al. ............ 717/178 |
| 2005/0060396 A1 | 3/2005 | Hirooka |
| 2006/0058847 A1 | 3/2006 | Lenz et al. |

FOREIGN PATENT DOCUMENTS

JP 1-274209 A 11/1989

OTHER PUBLICATIONS

Invitation to Respond to Written Opinion dated Mar. 25, 2010, issued in corresponding Singapore Patent Application No. 200717537-5.

* cited by examiner

*Primary Examiner* — Tejal Gami
(74) *Attorney, Agent, or Firm* — Westerman, Hattori, Daniels & Adrian, LLP

(57) ABSTRACT

The invention is a system for monitoring the status of a field device having data including a data acquisition module, a first and a second diagnosis engine, and a client having a user input element for receiving user input status.

6 Claims, 5 Drawing Sheets

| | | Diagnostic Target | Diagnostic Item | Diagnosis Name | Diagnosis Time | Diagnosing Type | Module Status |
|---|---|---|---|---|---|---|---|
| ☉ | ☑ | ▲ 1 | ▲ 3 | | 01/02/2006 12:34:12 | | |
| ◇ | ▷ | DY-FF01 | Basic Diagnosis | | | | |
| ◇ | L | DY-FF01 | Manual Status Input | | | | |
| ◇ | L | DY-FF01 | PrmUserDiag2000 | PrmUserDiag2000 | 02/04/2006 07:34:12 | FF-H1 device | Running |
| ● | ▷ | DY-FF01 | PrmUserDiag2001 | PrmUserDiag2001 | 11/04/2006 07:44:12 | FF-H1 device | Running |
| ◇ | ▷ | DY-FF02 | Basic Diagnosis | | 01/02/2006 12:34:12 | | |
| ◇ | L | DY-FF02 | Manual Status Input | | | | |
| ◇ | L | DY-FF02 | PrmUserDiag3000 | PrmUserDiag3000 | 26/05/2006 07:34:12 | FF-H1 device | Stopped |
| ◇ | L | DY-FF02 | PrmUserDiag3001 | PrmUserDiag3001 | 03/04/2006 07:34:12 | FF-H1 device | Running |

SYSTEM AND METHOD FOR DISPLAYING STATUS OF FIELD DEVICES

FIELD OF INVENTION

The invention relates to a system and method to display status of field devices.

BACKGROUND OF THE INVENTION

In prior art systems for monitoring field devices in a Plant, the statuses of the field devices are used to indicate the health of the devices and this is important for identifying the overall integrity of the Plant. The statuses of the devices are displayed in colours and values in various applications. These applications have different internal algorithms to calculate the status colour. Since different input data and algorithms are used for calculating the values of the status, the calculated values are of different types. Therefore, status values calculated from different applications are displayed separately. This is very inefficient and inconvenient for monitoring the overall Plant status generated from the different applications.

FIG. 1 is an example of a display according of the status calculated by one application. The display is an overall view of the field devices in a plant having a hierarchical relationship. The field devices and their status colour are displayed in an expandable parent folder. If there is more than one field device in a folder, the status colour having the most critical value is displayed for the folder.

There are cases where the calculated status colour is found to be incorrect after an operator has checked the field device physically. This is likely to be caused by an error in the algorithm or data retrieval.

Further, the status of the parent folder is not reflected accurately if the most critical value is from an unimportant field device.

Therefore, there is a need to enable a more accurate status display of the Plant.

SUMMARY OF THE INVENTION

The invention is a system for monitoring the status of field devices having data including a data acquisition module, a first and a second diagnosis engine, and a client having a user input element for receiving user input status.

BRIEF DESCRIPTION OF THE DRAWINGS

FIGS. 4A and 4B are examples of a graphical user interface.

DETAILED DESCRIPTION OF THE PREFERRED EMBODIMENT

Figure 1:
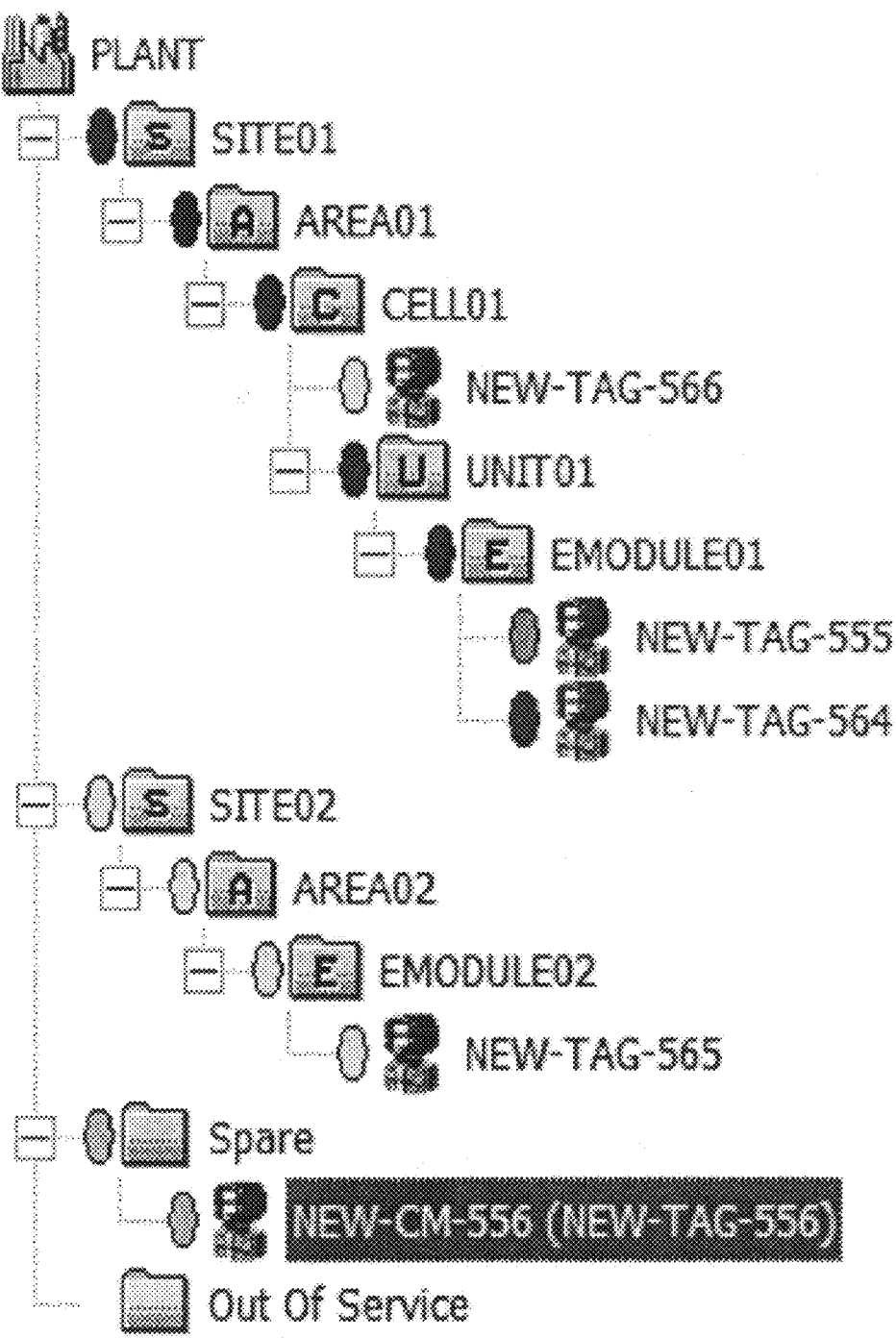
FIG. 1 is an example display in the prior art.
Figure 2:
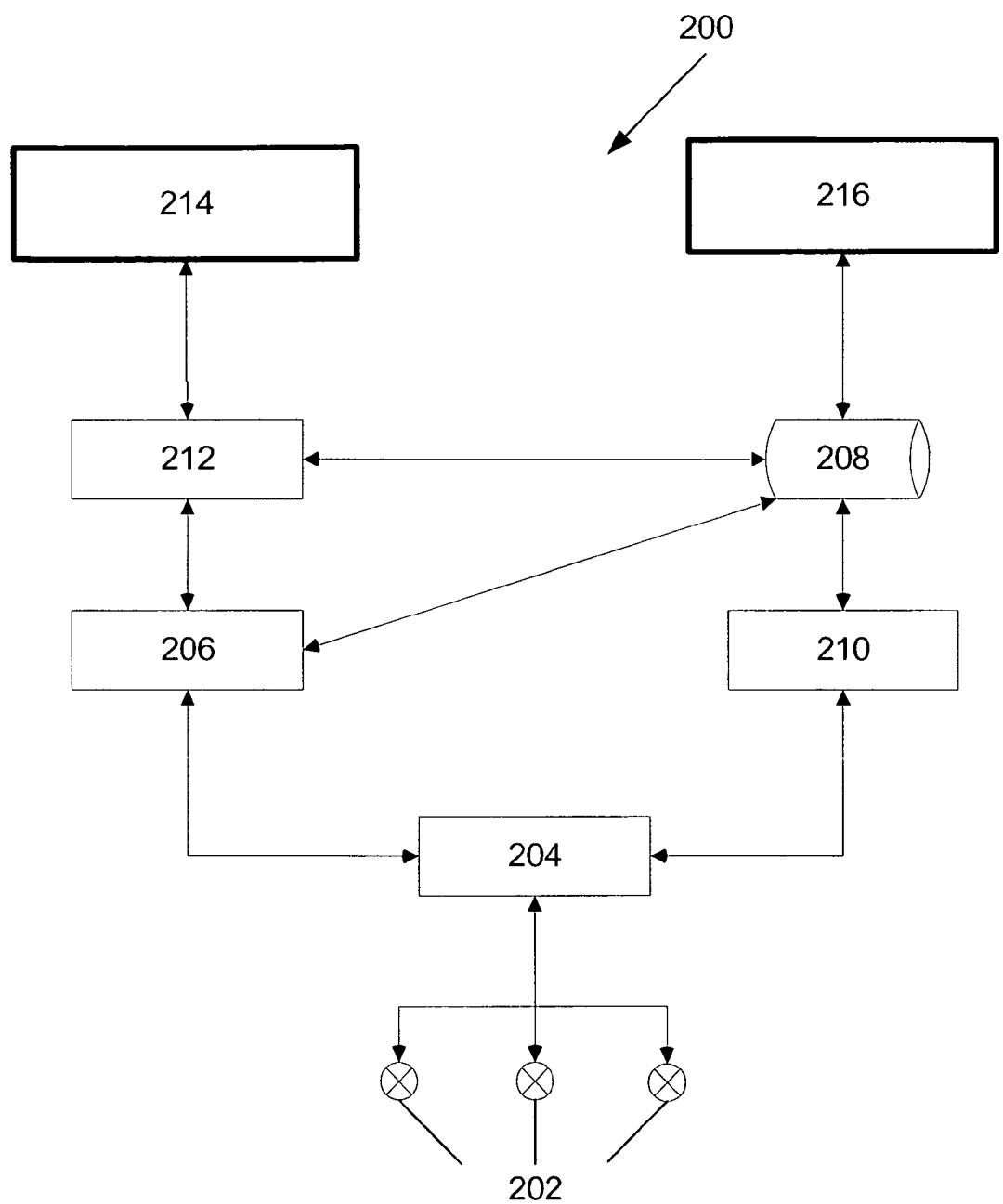
FIG. 2 is a preferred embodiment of the invention.

FIG. 2 is an illustration of a preferred embodiment of the system 200 for monitoring the status of multiple field devices 202. A data acquisition module 204, referred to as Diagnosis Acquisition (DAQ) module, reads the actual status and data of the field devices 202. A first diagnosis engine 206, referred to as Basic Diagnosis Engine (BDE) interfaces with the DAQ module 204 to read the data from the field devices. The BDE 206 inputs the data from the field devices 202 into its repository of algorithms for calculating a first status of the field devices 202. The first calculated status is updated to a database 208, which is the Plant Resource Manager database (Resource Manager database).

A second diagnosis engine 210, an Advanced Diagnosis Server (ADS), interfaces with the DAQ 204 to read in the actual data from the field devices 202. The ADS 210 has the ability to execute applications, such as Plant Resource Manager Advance Diagnosis Application (PAA), containing complex algorithms, which have been specially designed to diagnose the status of a particular kind of device. Such applications are usually designed by the manufacturers of the field devices since they have full knowledge of the internal configuration of the field devices.

The applications apply the data from the field device to calculate a second status value which represents the status of the field device. Multiple applications for each field device can be run simultaneously to calculate the different kinds of status for each field device based on the device data retrieved from the DAQ 204. Examples of the device data include temperature and pressure. The second calculated statuses are written to the Resource Manager database 208.

The BDE 206 and the ADS 210 translate the calculated status to a predefined corresponding image for display on a graphical user interface. The value of the calculated status varies for different parameters and different field devices. It is more reader-friendly for the status to be represented by predefined images. For example, for colour images, "Red" is predefined for a value which is bad, "Green" for a good value and "Orange" for an intermediate value. Alternatively, the predefined images have different patterns.

A client 212, referred to as the Plant Resource Manager Client, interfaces with the Resource Manager database 208 for displaying the calculated first and the second statuses of the field devices on a graphical user interface. The client can also interface directly with the BDE 206 and the ADS 210 to obtain the calculated first and second statuses. In the client, there is a Diagnosis Window 214 for retrieving the relevant calculated status values for the field devices from the Resource Manager database 208 for display on a graphical user interface. The Diagnosis Window 214 can display a list of all the PAA modules which are assigned for a particular device. It is also able to display a list all the PAA modules assigned to all the field devices under a certain parent folder.

In the preferred embodiment, the client 212 has a user input element for receiving a user input status for each field device. The Diagnosis Window 214 is configurable to over-ride the calculated status of each field device with the user-input status. This allows an accurate representation of health of the field devices and hence the Plant.

The Resource Manager database 208 further includes an integration module 216 for integrating the calculated first and second statuses of the related field devices belonging to the same parent. The integration module 216 determines the most critical status value of the field devices belonging to the same parent or grandparent and displays the most critical status value with the name of the parent or grandparent.

Further, the client 212 has a graphical user interface element for a user to select the statuses of the field devices for display. Based on the selection, the Diagnosis Window 214 configures the graphical user interface to display the selected statuses and the corresponding images. The integration module 216 determines the most critical value for the parent or grandparent folder from the selected statuses. Thus, the status of the parent or grandparent folder is reflected without considering a non-selected status value, which is usually not critical or of no material relevance to the folder.

Figure 3:
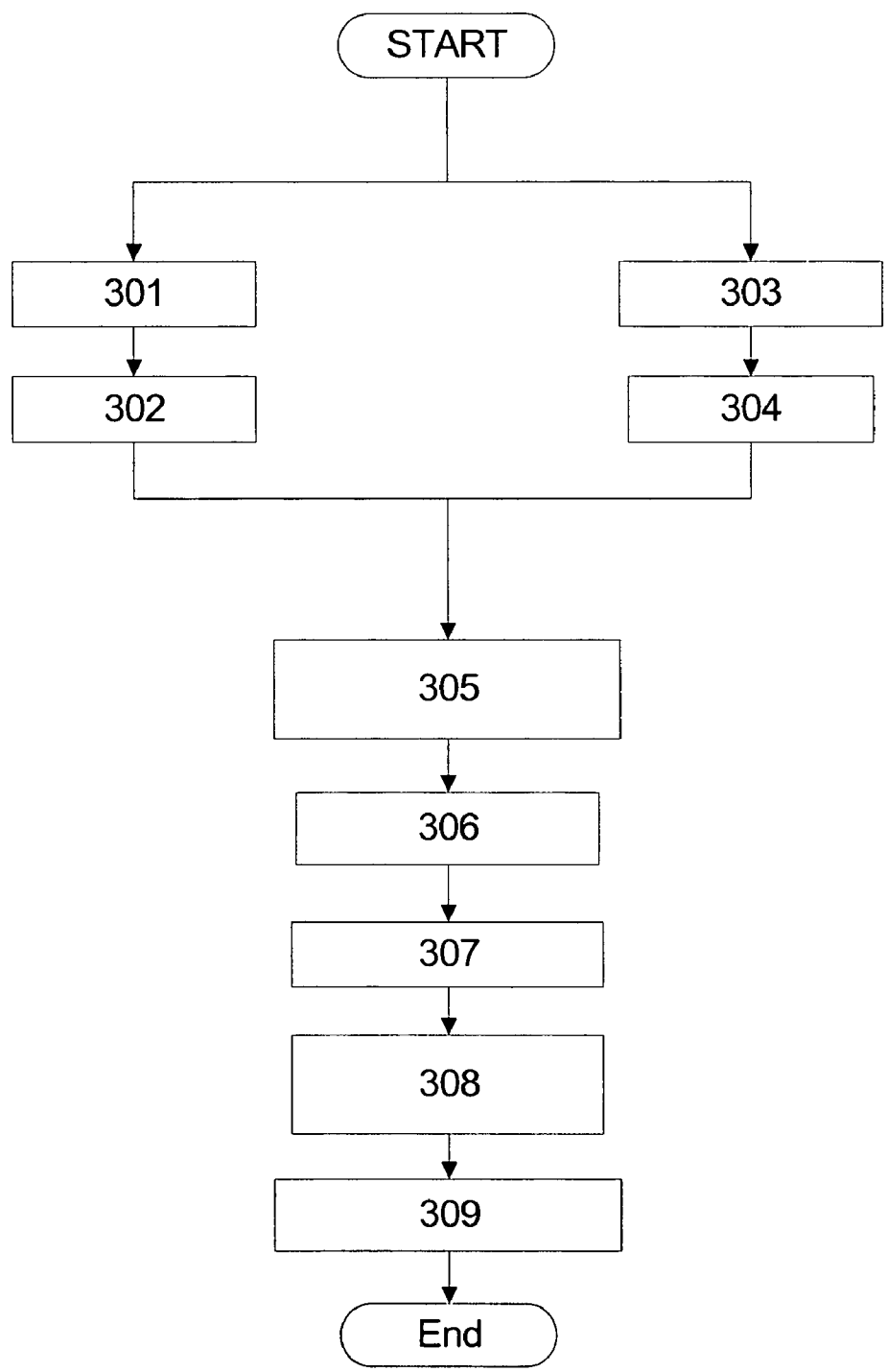
FIG. 3 is a process diagram of the invention.

FIG. 3 shows one embodiment of the method in the invention.

In Step 301, the BDE 206 calculates the first status value for all the field devices 202 and translates the values to corresponding predefined images. The BDE 206 in Step 302 updates the Resource Manager database 208 with both the calculated values and the translated images.

In Step 303, the ADS 210 calculates the second status value for all the field devices 202 and translates the values to the corresponding predefined images. The ADS 210 in Step 304 updates the Resource Manager database 208 with both the calculated values and the translated images.

Steps 301, 302, 303 and 304 are performed periodically.

Step 305 displays on a graphical user interface in the Diagnosis Window 214, for all the field devices 202, the first and second statuses, the corresponding images, the user-input status and the checkboxes. Examples of the graphical user interface is shown in FIGS. 4A and 4B.

In FIG. 4A, the diagnostic items, for each respective type of status, are indicated in column 401. The name of the field device in column 402, the checkbox in column 403 and the corresponding image for the status in column 404. The checkboxes have mechanisms to include or exclude some or all diagnostic items for the field devices. If all the diagnostic items are excluded for a field device, the field device will not be included in the integration for the parent or grandparent folder.

Figure 4B:
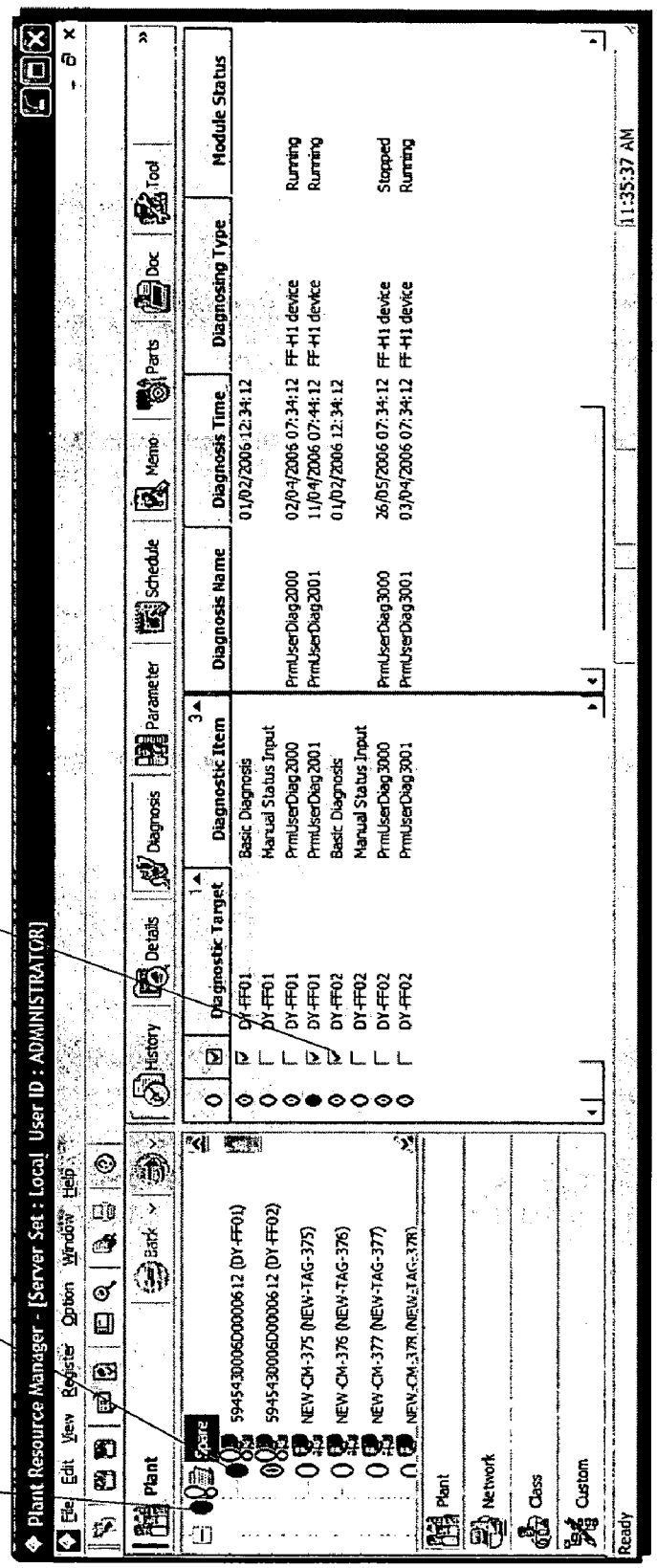

In FIG. 4B, the graphical user interface further includes a list of all the field devices and their respective parent or grandparent folder. Reference numeral 411 shows a selected diagnostic item or diagnostic target, with marked checkbox. Reference numeral 412 shows the status for a device after integration. Reference numeral 413 shows the status for a folder after integration.

Referring back to FIG. 3, Step 306 allows a user to select the statuses of the field devices for display using a graphical user interface element. Preferably, the element is a checkbox.

Step 307 enables a user to save changes to the database after selecting the statuses of the field devices. Step 308 updates the images after the integration is completed. The updated images are displayed in Step 309.

We claim:
1. A system for monitoring the status of a plurality of field devices having data including:
 (a) a data acquisition module for reading the status and data of said field devices;
 (b) a first diagnosis engine interfacing with said data acquisition module and having a first repository of algorithms for calculating a first status for each of said field devices;
 (c) a second diagnosis engine interfacing with said data acquisition module and having a second repository of algorithms for calculating a second status for each of said field devices;
 (d) a client interfacing with said first diagnosis engine and said second diagnosis engine for displaying said calculated first statuses and said second statuses of said field devices;
 (e) an integration module for determining a most critical status value from a plurality of selected statuses, each of said selected statuses being selected from said calculated first status and said calculated second status for each of said field devices; and
 (f) the client interfacing further for displaying said most critical status value with a name of a folder, said folder being associated with said field devices, wherein said client interfacing further includes a user input element for receiving user input status.

2. A system as claimed in claim 1 further including a database for said first and second diagnosis engines for storing the calculated first and second statuses, and said client interfacing with said database for:
 (i) displaying said calculated first statuses and said second statuses of said field devices; and
 (ii) storing received user-input status.

3. A system as claimed in claim 2 wherein the integration module is included in the database and is configured for integrating the calculated first and second statuses for related field devices.

4. A system as claimed in claim 1 wherein said client interfacing further includes a graphical user interface element for a user to select statuses of field devices for display.

5. A system as claimed in claim 4 wherein said graphical user interface element is a checkbox.

6. A system as claimed in claim 1, wherein the folder has a hierarchy higher than a hierarchy of another folder.

* * * * *